US009661022B2

(12) United States Patent
Shetty et al.

(10) Patent No.: US 9,661,022 B2
(45) Date of Patent: May 23, 2017

(54) SYSTEM AND METHOD FOR AUTHORIZING DEVICES JOINING A NETWORK FABRIC

(71) Applicant: DELL PRODUCTS L.P., Round Rock, TX (US)

(72) Inventors: Sudhir Vittal Shetty, Cedar Park, TX (US); Arun Sarat Yerra, Santa Clara, CA (US); Harish R. Gajulapalle, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 20 days.

(21) Appl. No.: 14/696,249

(22) Filed: Apr. 24, 2015

(65) Prior Publication Data

US 2016/0315964 A1    Oct. 27, 2016

(51) Int. Cl.
*H04L 29/06* (2006.01)

(52) U.S. Cl.
CPC .......... *H04L 63/168* (2013.01); *H04L 63/105* (2013.01)

(58) Field of Classification Search
CPC ...... H04L 63/20; H04L 63/10; H04L 63/0236
USPC ........................................................... 726/1
See application file for complete search history.

(56) References Cited

U.S. PATENT DOCUMENTS

| 7,634,586 | B1 * | 12/2009 | Norrie | G06F 13/4291 710/3 |
| 7,779,197 | B1 * | 8/2010 | Norrie | G06F 13/4022 710/305 |
| 9,282,054 | B2 * | 3/2016 | Murray | H04L 47/70 |
| 2005/0080901 | A1 * | 4/2005 | Reader | H04L 63/104 709/226 |
| 2008/0008202 | A1 * | 1/2008 | Terrell | H04L 12/5693 370/401 |
| 2014/0115182 | A1 * | 4/2014 | Sabaa | H04L 67/1097 709/232 |
| 2015/0124643 | A1 * | 5/2015 | Pani | H04L 12/18 370/254 |

* cited by examiner

*Primary Examiner* — Mahfuzur Rahman
(74) *Attorney, Agent, or Firm* — Haynes & Boone, LLP

(57) ABSTRACT

A control unit that is configured to instruct a device to implement a limitation on a port and broadcast a controller address. The control unit is further configured to receive first identification information associated with a second device connected to the port from the device, the first identification information being addressed to the controller address. Additionally, the control unit is configured to establish a communication link with the second device through the device and the port, receive second identification information associated with the second device over the communication link, determine whether the second device is authorized based on a policy, determine whether the first identification information and second identification information match, and instruct the first device to remove the limitation on the port in response to determining that the second device is authorized and that the first identification information matches the second identification information.

14 Claims, 3 Drawing Sheets

SYSTEM AND METHOD FOR AUTHORIZING DEVICES JOINING A NETWORK FABRIC

BACKGROUND

The present disclosure relates generally to information handling systems, and more particularly devices, systems, and methods for securely adding devices onto a network.

As the value and use of information continues to increase, individuals and businesses seek additional ways to process and store information. One option is an information handling system (IHS). An IHS generally processes, compiles, stores, and/or communicates information or data. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling many types of communication and information, which is constantly growing. Making this possible is a vast array of network switching products that make forwarding decisions in order to deliver packets of information from a source system or first network node to a destination system or second network node. Recently software defined network (SDN) controllers have enabled system administrators to easily add new devices onto a network based on software configurations rather than manual configuration of every device. However, a drawback to this convenience is an increased security risk to the data network. Individuals with malicious intent may use a device to join the private data network and obtain unauthorized access to other devices on the private data network.

Accordingly, a system and method for providing network access to authorized devices while preventing access to unauthorized devices would be desirable.

SUMMARY

According to an exemplary embodiment, a network device includes a control unit. The control unit may be configure to instruct a first device connected to the networking device to implement a limitation on a port; instruct the first device to broadcast a controller address; receive a first identification information regarding a second device connected to the port from the second device, the first identification information being addressed to the controller address; establish a communication link with the second device through the first device and the port; receive a second identification information regarding the second device over the communication link; determine whether the second device is authorized based on a predetermined policy; determine whether at least a portion of the first identification information and at least a portion of the second identification information match; and instruct the first device to remove the limitation on the port in response to determining that the second device is authorized based on the predetermined policy and determining that the portion of the first identification information matches the portion of the second identification information.

According to another exemplary embodiment, A information handling system includes a switching device with a control unit. The control unit may be configured to instruct a switch connected to the switching device to implement limitations on a first and second port of the switch; receive configuration information from the switch; identify the first port as connected to a second switch; instruct the switch to remove the limitations on the first port in response to identifying the first port as connected to the second switch; identify the second port as connected to a second device; instruct the switch to broadcast a controller address; receive a first identification information regarding the second device connected to the second port from the switch, the first identification information being addressed to the controller address; establish a communication link with the second device through the switch and the second port; receive a second identification information regarding the second device over the communication link; determine whether the second device is authorized based on a predetermined policy; determine whether at least a portion of the first identification information and at least a portion of the second identification information match; and instruct the switch to remove the limitation on the second port in response to determining that the second device is authorized based on the predetermined policy and determining that the portion of the first identification information.

According to another exemplary embodiment, a method of securely providing a device access to a network fabric includes instructing a switch within the network fabric to implement a limitation on a port that the device is connected to; instruct the switch to broadcast a controller address; receive a first identification information regarding the device connected from the switch, the first identification information being addressed to the controller address; establish a communication link with the device through the switch and the port; receive a second identification information regarding the device over the communication link; determine whether the device is authorized based on a predetermined policy; determine whether at least a portion of the first identification information and at least a portion of the second identification information match; and instruct the switch to remove the limitation on the port in response to determining that the device is authorized based on the predetermined policy and determining that the portion of the first identification information matches the portion of the second identification information.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
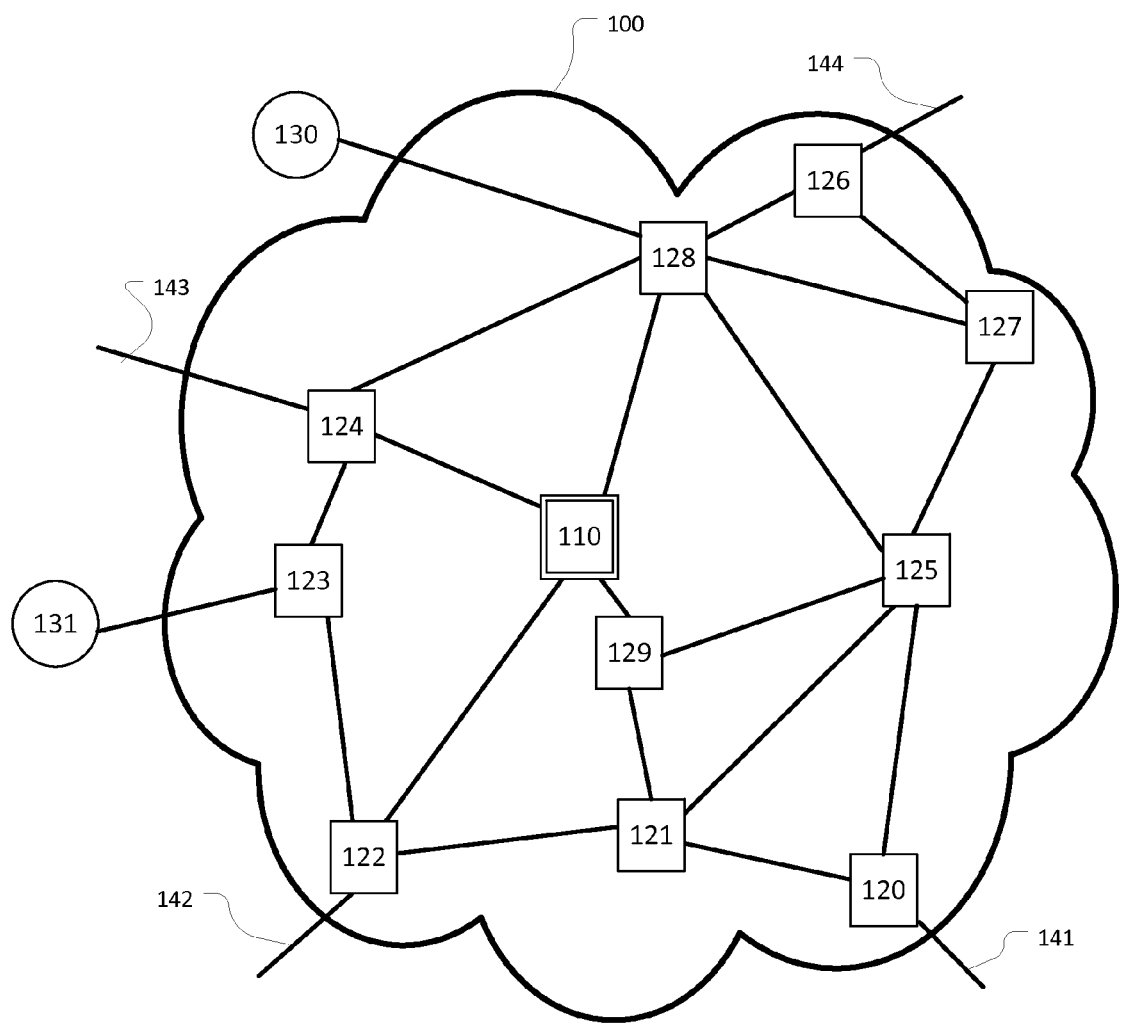
FIG. 1 illustrates a simplified diagram of a network for enabling connectivity between devices according to some embodiments.

FIG. 1 is a simplified diagram of a network 100 according to some embodiments. As shown in FIG. 1, network 100 includes a network controller 110. In some examples, network controller 110 may provide centralized management of network 100 and the network traffic throughout network 100. In some examples, network controller 110 may be using software defined networking (SDN). In SDN, management and control of forwarding within network 100 may be at least partially separated from network switching devices that do the actual forwarding. In some examples, this may be used to provide more centralized management and control of the forwarding. In some embodiments, network controller 110 may be distributed over several controllers.

Network 100 further includes one or more network switching devices or switches, including switches 120-129. Although only ten switches 120-129 are shown in FIG. 1, one of ordinary skill in the art would recognize that network 100 may include any number of switches. Network 100 may be connected to representative network devices 130 and 131 outside of network 100. As with the switches 120-129, network 100 may be connected to any number of network devices. In some examples, network devices 130 and 131 may be devices that can be coupled into network 100, but may not provide the same switching and forwarding functions as switches 120-129. In some examples, network devices 130 and 131 may be leaf nodes. In some examples, network devices 130 and/or 131 may be servers. In some examples, network devices 130 and/or 131 may be user devices such as computers, mobile devices, and/or the like.

Network links may be used to couple together network controller 110, the switches 120-129, and the network devices 130 and 131 in various arrangements. As shown in FIG. 1, network links are depicted using lines between the switches 120-129 and/or the network devices 130 and 131. For example, switch 128 is coupled to switches 120, 121, 129, 125, and 127 using corresponding network links. In contrast, switch 122 is coupled only to switches 121 and 123 as well as to network controller 110 using corresponding network links. Network device 130 is coupled only to switch 125 using a corresponding network link. Although only one network link is shown between any two switches 120-129, network controller 110, and network devices 130, 131, one of ordinary skill in the art would recognize that multiple parallel network links and/or link aggregation groups (LAGs) may be used as well. In some examples, network links between two switches may be inter-switch links.

Network 100 further supports forwarding of network traffic between network controller 110, the switches 120-129, and the network devices 130 and 131. For example, network traffic may be forwarded from switch 127 to switch 124 using one or more of many potential routes. In some examples, network traffic may be forwarded from switch 127 through switch 125 to switch 124. In some examples, network traffic may be forwarded through switches 128, 121, 122, and 123 to switch 124. In some examples, other routes may be used.

Network controller 110 may regulate device access to network 100 by managing one or more switches 120-129. For example, network controller 110 may instruct one or more switches 120-129 to stop forwarding data from one or more ports and/or network links. In some examples network controller 110 may implement connection policies instructing one or more switches 120-129 to block ports connected to unauthorized devices.

In some examples, network controller 110 may manage the base topology of network 100 by instructing one or more switches 120-129 to block/drop data traffic on ports for certain network links between one or more switches 120-129. For example, controller 110 may block one or more ports corresponding to the network link between switches 125 and 129. In this manner, the network topology would be set so that there is direct unidirectional data transfer, limited data transfer, or no direct data transfer between switches 125 and 129. Other configurations would be apparent to one of ordinary skill in the art and are contemplated herein Network 100 further supports forwarding and/or routing of network traffic to networks other than network 100. As shown in FIG. 1, network 100 is coupled to other networks using network links 141-144.

Characterizing and/or recognizing patterns in the topology of network 100 may not be trivial. In some examples, it may not be readily apparent whether the topology of network 100 may be able to support one or more base topologies. In some examples, the base topologies may include topologies that support one or more forwarding protocols. In some examples, the one or more protocols may include virtual link trunking (VLT), stacking protocols, spanning tree protocol (STP), multiple spanning tree protocol (MSTP), shortest path bridging MAC (SPBM), transparent interconnection of lots of links (TRILL), and/or the like.

Figure 2:
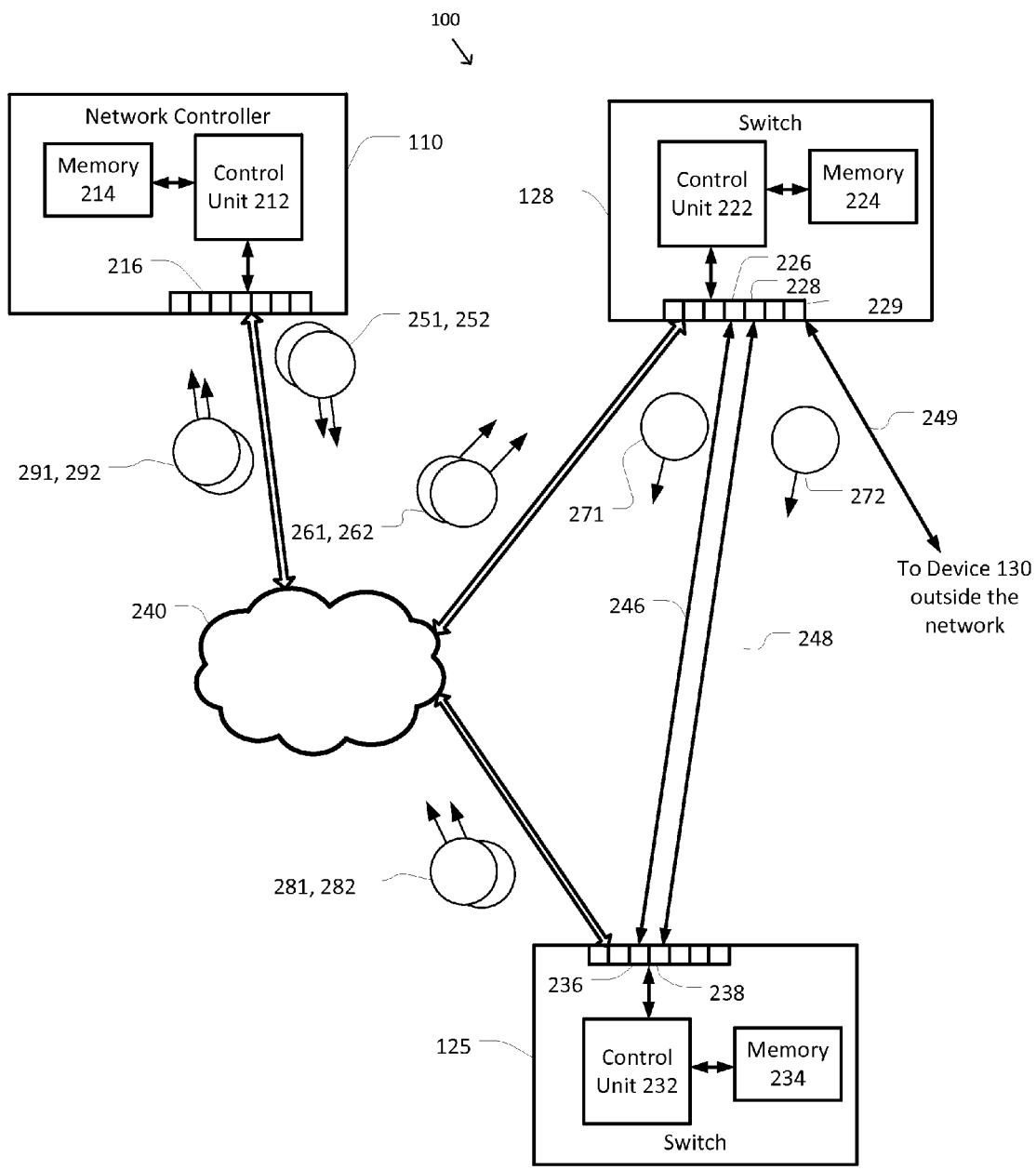
FIG. 2 illustrates a simplified diagram of a portion of the network of FIG. 1 according to some embodiments.

FIG. 2 is a simplified diagram of a portion of the network 100 of FIG. 1 according to some embodiments. As shown in FIG. 2, a representative portion of network 100 is depicted, which includes network controller 110 and switches 128 and 125. FIG. 2 also depicts further details of network controller 110 and switches 128 and 125, as well as several network links in network 100.

Network controller 110 includes a control unit 212 and memory 214. Control unit 212 is coupled to memory 214 and may control the operation of network controller 110. In some examples, control unit 212 may include one or more processors. Network controller 110 further includes one or more ports 216 for coupling network controller 110 to other switches and/or network devices using network links. In this manner the network controller may manage the coupled devices and receive status updates.

Switch 128 includes a control unit 222 and memory 224. Control unit 222 is coupled to memory 224 and may control the operation of switch 128. In some examples, control unit 222 may be used to make forwarding decisions for network traffic being handled by switch 128. In some examples, the control unit 222 may include one or more processors. Switch 128 further includes one or more ports, including ports 226 and 228, for coupling switch 128 to other switches, network devices, and/or network controllers.

Similarly, switch 125 includes a control unit 232 and memory 234. Control unit 232 is coupled to memory 234 and may control the operation of switch 125. In some examples, control unit 232 may be used to make forwarding decisions for network traffic being handled by switch 125. In some examples, the control unit 232 may include one or more processors. Switch 125 further includes one or more ports, including ports 236, 238, and 239 for coupling switch 125 to other switches, network devices, and/or network controllers.

The memories 214, 224, and/or 234 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The portion of network 100 further depicts some interconnections between network controller 110 and switches 128 and 125. A significant portion of the interconnections are abstracted as a sub-network 240. Sub-network 240 may include many of the switches, network devices, and network links of network 100. Sub-network 240 is coupled to the one or more ports 216 of network controller 110, some of the one or more ports of switch 128, and some of the one or more ports of switch 125. In some examples, sub-network 240 may include at least switch 129 as well as the network link between network controller 110 and switch 129, between switch 129 and switch 128, and between switch 129 and switch 125. In some examples, sub-network 240 may further include others of switches 120 and 122-127, network devices 130 and 131, and/or corresponding network links between them.

FIG. 2 further depicts several network links 246 and 248 coupling switches 128 and 125. Network link 246 couples port 226 of switch 128 to port 236 of switch 125. Network link 248 couples port 228 of switch 128 to port 238 of switch 125.

Figure 3:
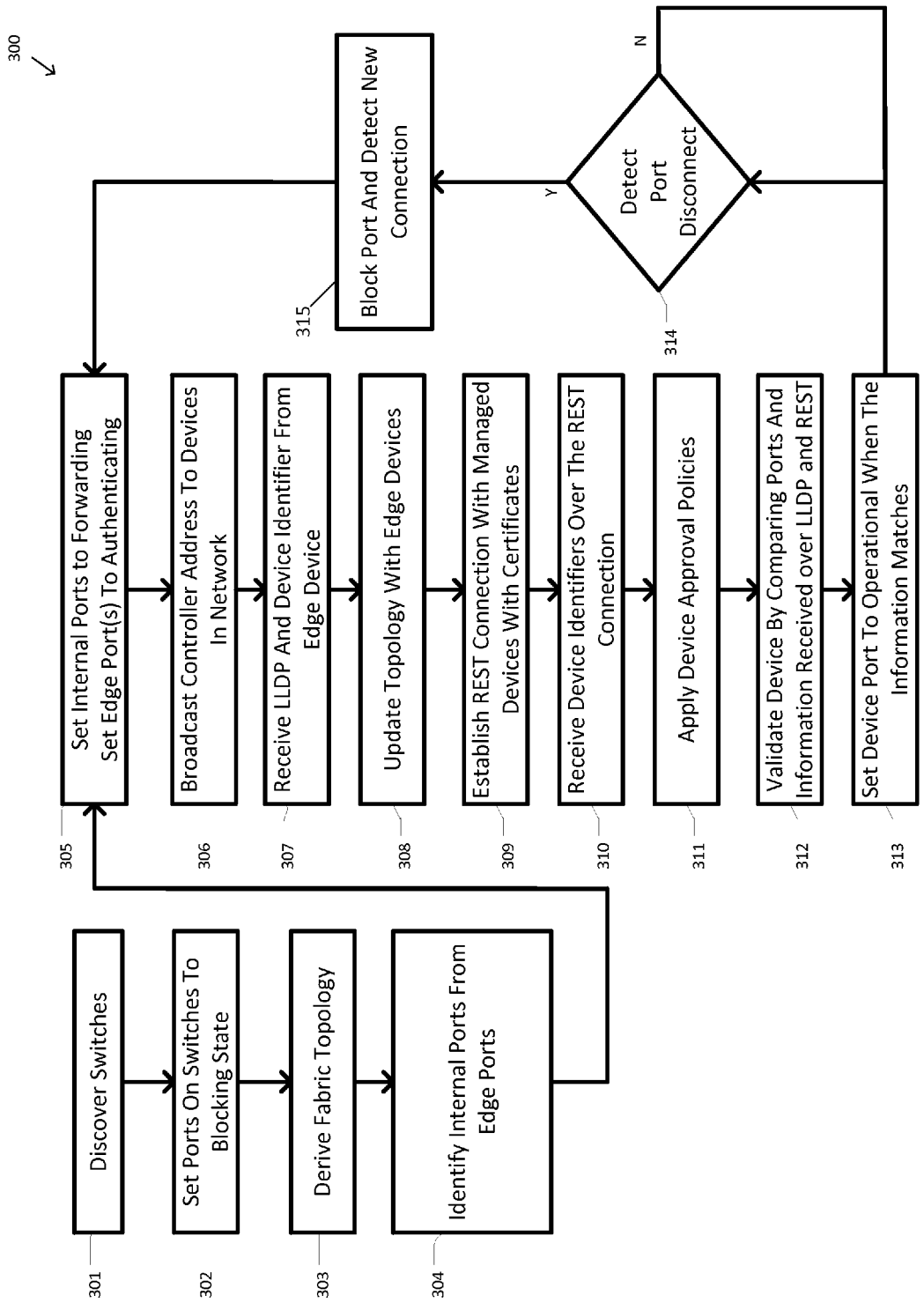
FIG. 3 illustrates a flow chart illustrating method for authorizing devices joining a network fabric.

FIG. 3 illustrates a flow chart illustrating a method 300 for authorizing devices joining a network fabric, such as network 100 of FIG. 1, according to some embodiments. The in some embodiments, method 300 may be implemented by one or more controllers, such as network controller 110 of FIG. 1. According to some embodiments, method 300 may include one or more of the processes 301-315 which may be implemented, at least in part, in the form of executable code stored on a non-transitory, tangible, machine readable media that when run on one or more processors may cause the one or more processors to perform one or more of the processes 301-315. According to some embodiments, method 300 may be performed using variations among process 301-315 as would be recognized by one of ordinary skill in the art.

At process 301 the controller may initially discover switches that are present within the network fabric for management. In some examples, the discovery may be accomplished by instructing each switch within the network fabric (e.g., switches 120-129 of FIG. 1) to announce their presence to the network controller using initiation messages. In response, switches within the network fabric may transmit one or more initiation messages to the controller. When the switch is directly coupled to the controller, the controller may receive the initiation message directly from the switch. A controller may be coupled to a switch through a network link connecting a port of the network controller to a port of the switch. When the switch is not directly coupled to the network controller, other switches in the network may forward and/or flood the initiation message to the network controller.

In some examples, the initiation message may be OpenFlow messages using the OpenFlow protocol. In some examples, the initiation messages may include a request to the network controller to join the network. The controller may transmit a reply admitting the switch to the network. The pair of initiation and reply messages may create a management session between the network controller and the switch that may be used to exchange further messages. In some examples, the controller may send discovery requests to switches in the network and the switches may respond with corresponding discovery responses.

In some examples, the network controller may transmit one or more request messages to the switches within the network fabric. The messages may request configuration and status information from the switches. In some examples, the switches may respond with configuration information, status messages, and/or identifying information. In some examples, the configuration and status messages may include a switch type, switch identifies, and/or the like. The network controller, based on the configuration and status messages, may determine how many ports the switches include and a bandwidth of each of the ports on the switches. In some examples, the configuration and status messages may include a count of a number of the active ports on the corresponding switch. In some examples, the management messages and/or the configuration and status messages may be provided using OpenFlow messages.

At process 302, the controller may instruct the switches within the network, such as the switches discovered in process 301, to implement limitations on data traffic received by the switches. For example, the controller may request or instruct that ports on the switches be set to a blocking or partially blocking state. When a port is set to a blocking state, the switch may limit forwarded data traffic to certain reserved data traffic, such as link layer discovery protocol (LLDP) and/or link aggregation control protocol (LACP) data traffic, while other data traffic may be blocked and/or dropped. In this manner, limited communications between the controller and the devices is allowed for identification, management, and/or authorization.

At process 303, the controller may determine the topology of the network. The topology of the network may be determined by analyzing LLDP and/or LACP communications. The LLDP/LACP communications may include initiation messages, media access controller ("MAC") address discovery packets for identifying switches and/or other devices, and/or configuration and status messages sent to and/or received from the switches. For example, the controller may learn about each inter-switch link in the network based on discovery responses from the switches within the network fabric. The discovery responses may include information such as the originating switch identifier, receiving switch identifier, ingress port identifier, egress port identifier, and/or the like. In some examples, the originating switch identifier, egress port identifier, receiving switch identifier, and ingress port identifier may indicate to the network controller the existence of a functioning inter-switch link between the egress port of the originating switch and the ingress port of the receiving switch. In some examples, the network controller may have also transmitted a corresponding reciprocal discovery request to the receiving switch for the ingress port that may result in its own discovery response for the same network link. In some examples, when the network controller does not receive a discovery response corresponding to one of the discovery requests, the network controller may conclude that the respective port is not coupled to an inter-switch link. In some examples, this may occur when the port is coupled via a network link to a network device that is not a switch or to a switch in another network.

In some embodiments, the controller may identify possible data loops within the network fabric, adding further detail to the network topology. The controller may be able to configure switches to avoid data traffic loops once the network topology is derived. For example, the controller may configure certain ports used for inter-switch links to be set to a blocked state. In some examples, the controller may identify daisy-chain patterns and/or configuration loops within the interconnected switches and assign rules to the switches to prefer data paths and/or inter-switch links exiting the loop. In some examples, the controller may apply rules and/or configurations that limit the number switches that can be a part of a daisy chain.

At process 304, the controller will determine which switch ports are connected to switches within the network fabric, such as the egress/ingress ports connected to inter-switch links, and which ports art not connected to switches that make up the network fabric. Ports on switches within the network fabric that are connected to other switches within the network fabric may be identified as internal ports. The rest of the ports of switches within the network fabric may be identified as edge ports. The edge ports may be connected to servers, switches not part of the network fabric controlled by the controller, and/or other network devices not part of the network fabric, such as device 130 of FIG. 1. The controller may identify and/or discover internal ports and edge ports by analyzing information associated with LLDP and/or LACP between switches and other devices, initiation messages, egress/ingress port information, and/or configuration and status messages sent to and/or received from the switches similar to and/or during process 303 above.

At process 305 the controller may instruct switches to set internal ports to a forwarding state and edge ports to an authenticating state. Ports set to a forwarding state will allow all data traffic received on the port to be transmitted by the switch in an unrestricted manner. When a port is set to an authentication state, the respective switch may limit forwarding of data traffic received on the port to management data traffic (e.g. HTTPS connection to the IP address of the controller) along with LLDP and/or LACP data. In some embodiments, the controller may configure the switches to drop data received on the edge ports that is not considered LDAP, LACP, or management data. In some examples, the controller may set up a VLAN for management data to be communicated over.

In some embodiments, the controller may also configure the switches to implement a user defined topology. For example, the controller may implement a spanning tree topology for the network. The controller, when implementing a spanning tree topology, may block certain identified internal ports for preventing communications over redundant connections and/or network paths. One of ordinary skill in the art would recognize that there are numerous topologies that may be implemented by the controller, all of which are contemplated herein.

At process 306, the controller may broadcast an address of the controller for allowing devices to communicate with the controller. For example, the controller may send data that contains the IP address of the controller and the management VLAN information. The switches connected to the controller may relay this information to devices connected to the edge ports (this may be referred to as an "edge device"). In this manner the devices may attempt to establish a connection to the controller for authentication and/or authorization to join the network.

At process 307, the controller may receive LLDP information and/or data originating from and/or associated with devices connected to the edge ports. The LLDP data may be relayed by several intervening switches between the edge port and the controller. In some examples, edge devices connected to the edge ports may each broadcast or emanate LLDP traffic to the respective switch. The switch may relay this information to provide the controller with information regarding the respective device. The LLDP traffic may include information identifying the device and the port the device is connected to In this manner, the controller may complete the network topology by including the devices connected to the edge ports. In some examples, the edge devices may provide digital signatures, hashes, and/or keys for authenticating the ended device.

At process 308, the controller may process the LLDP data originating from devices connected to edge ports for analysis and updating the network topology with device to edge port connectivity information. The controller may record the topology and/or received information onto a non-transitory computer readable memory, such as memory 214 of FIG. 2. For example, the controller may record the device identifier as connected to a particular edge port identified by a port identifier that is on a particular switch identified by a device identifier for the switch. Some of this information may be derived from the information the controller received at process 303 and/or process 304.

An exemplary network discovery mechanism that may be implemented as part of one or more processes 301-308 are illustrated in greater detail with reference back to FIG. 2. As a result of performing processes 301-308, network controller 110 knows about switch 128, that ports 226, 228, and 229 of switch 128 are active/connected ports, and which ports are disconnected and/or inactive (not shown). Additionally, controller 110 may also recognize that ports 226 and 228 are connected to a switch within the network fabric and that port 229 is not. Similarly, controller 110 may have identifying information associated with devices connected to switch 128. In this manner controller 110 may recognize which ports on each switch, such as switch 128, are generally connected to other devices within the fabric or connected to a device outside of the network fabric. As an exemplary network discovery mechanism shown in FIG. 2, network controller 110 is transmitting discovery request messages 251 and 252. Discovery request message 251 may be directed to switch 128 and requests that switch 128 transmit a discovery packet on port 226. Discovery request message 251 is forwarded through sub-network 240 where it is received by switch 128 as discovery request message 261. Following the instructions of discovery request message 261, switch 128 forms a discovery packet 271 including an originating switch identifier of 128 and an egress port identifier of 226 and transmits it using port 226 as the egress port. In some examples, discovery packet 271 including information regarding port 229. The information may include an identifier of device 130 connected to switch 128, ingress port identifies for port 229, and/or the like. In some examples, the identifier of device 130 may include a hash of a digital signature. The switch may discover information about device 130, such as a device identifier, through LLDP/LACP communications and/or the like. Discovery packet 271 is transmitted along network link 246 where it is received by switch 125 on port 236 making port 236 the ingress port. When switch 125 receives discovery packet 271, switch 125 forms a discovery response message 281 including the originating switch identifier 128 and egress port identifier 226 from discovery packet 271 and any other information within discovery packet 271, as well as its own switch identifier of 125 as the receiving switch identifier and the ingress port identifier 236. Discovery response 281 is then transmitted by switch 125 where it is forwarded through sub-network 240 and received by network controller 110 as discovery response message 291.

Similarly, discovery request message 252 requests that switch 128 transmit a discovery packet on port 228. Discovery request message 252 is received by switch 128 as discovery request message 262. In response, switch 128 forms and transmits a discovery packet 272 on port 228 including an originating switch identifier of 128 and an egress port identifier of 228. When discovery packet 272 is received by switch 125 on port 238, switch 125 forms and transmits a discovery response message 282 including the originating switch identifier 128 and egress port identifier 228 as well as its own switch identifier of 125 as the receiving switch identifier and the ingress port identifier 238. Discovery response 282 is then transmitted by switch 125 where it is forwarded through sub-network 240 and received by network controller 110 as discovery response message 292.

When network controller 110 receives discovery response message 291, which includes the originating switch identifier of 128, the egress port identifier of 226, the receiving switch identifier of 125, any other information in discovery packet 261, and the ingress port identifier of 228, network controller 110 may learn of switch 128, switch 125, network link 246, network link 249, and device 130. Although not shown in FIG. 2, network controller 110 may also learn of other devices, ports, and network links based on discovery request messages transmitted and returned as received discovery response messages.

At process 309, the controller may establish a communications connection with one or more of the devices connected to an edge port. In some embodiments the controller may implement a communication protocol based on representational state transfer ("REST"). For example, the REST communication protocol that the controller uses may be hypertext transfer protocol ("HTTP"), hypertext transfer protocol secure ("HTTPS"), and/or the like. In some examples, the controller may receive a REST connection request from an edge device connected to an edge port using the address transmitted by the controller at process 306.

In some embodiments, the communication protocol between the controller and edge devices connected to the edge port may be a secure socket layer ("SSL") connection. One benefit of using SSL as the communication protocol is that the controller and edge device may conduct mutual authentication of the SSL certificate for the controller and edge device. In some embodiments the SSL certificates may be signed by a trusted third party authority. One of ordinary skill in the art will recognize that there are many other communication protocols and certificates that may be used, all of which are contemplated herein.

At process 310, the controller may receive identifying information of the device connected to the edge port through the REST connection. At least a portion of the identifying inform received over the REST connection may include information that is similar to or the same as a portion of the LLDP and/or LACP information at process 307. For example, the edge device may communicate the edge port which the edge device is connected to over the REST connection. In this manner the controller can ensure that the edge device communicating over the REST connection is originating from the same port as the LLDP and/or LACP information at process 307 and that the devices are the same. In some embodiments, the controller may maintain records of device identifiers originating from an LLDP, LACP, and/or REST connection. The controller may also maintain a record of the edge port identifiers and device identifiers.

At process 311, the controller may implement one or more policies for approving a device to communicate over the network fabric on a particular edge port. In some embodiments the controller may notify an admin and/or network operator of the network that a device is attempting to join the network fabric, and the approval may depend on the response received from the admin. In some embodiments, the policies may be predetermined and preconfigured. The policies may define the types of devices allowed to join the network. For example, the policies may specify that devices with certain identifiers, configurations, and/or the like are approved for access to the network. In some examples, the policies implemented may deny approval and the controller may instruct the switch to maintain an authorization state for the respective edge port. In some examples, the controller may instruct the switch to set the respective edge port to a blocking state when approval is denied.

At process 312, the controller may check to see if the identifying information received over LLDP/LACP and the port over which the information was received from matches the identifying information received over the REST connection and the respective port. In some examples the port information may be part of the identification information received over LLDP/LACP and/or the REST connection. The controller may compare the device identifiers received through the REST connection and the origination edge port with the device identifiers received through LLDP and/or LACP and the respective edge port for a match. If there is a mismatch, the controller may instruct the switch to set/maintain the edge port at an authentication or blocked state. In some examples, the controller may set the port to a blocking state when there is a mismatch. In some embodiments, the identifying information may include a digital signature of the connected device. In some examples the digital signature may be encrypted and the controller may decrypt the digital signature using a key, such as a private and/or public key depending on the authentication method used. In some embodiments, the digital signature may be validated using a hash. In some embodiments the hash value may be sent through one mode of communication (e.g., LLDP/LACP) and the digital signature may be sent through another mode of communication (e.g., REST connection). In this manner the controller may be able to authenticate the device by applying the hash to the digital signature and comparing it to the received hash value. The controller may set the port to a blocked or authentication state if the device fails authentication.

At process 313, the controller, in response to determining that a device is approved based on the policies implemented at process 311 and that the ports and identifying information matches at process 112, may instruct the corresponding switch to set the edge port to an operational state and/or remove limitations on the edge port. This may allow for the device connected to the edge port to communicate to other devices connected to the network fabric.

At process 314, the controller may determine that a link between an internal switch or other device to a port is disconnected. The controller may periodically detect for a disconnected ports and/or reports from switches regarding disconnected ports. When the controller detects a disconnected port, the controller may, at process 315 instruct the switch to set the disconnected port to a blocking state and wait and/or detect a new device connection. In some embodiments, the controller may configure switches to automatically set disconnected ports to a blocking mode. When the disconnected port is set to a blocking state, the switch may allow LLDP and/or LACP data traffic when a device connects to the disconnected port.

When a new device is connected, the controller may detect a new connection to the disconnected port based on LLDP and/or LACP information received from the new device. The LLDP and/or LACP information may be information received by the switch with the disconnected port and forwarded to the controller. The controller may determine based on the LLDP and/or LACP information whether the ports in which the LLDP information is being communicated over is a previously disconnected port and whether the port is connected to a switch within the network fabric or an edge device. If the new device is a switch within the network fabric, the controller may treat the port as an internal port. Otherwise, the port may be treated as an edge port. The controller may, using the LLDP/LACP information update the topology of the network, and repeat method 300 from process 305.

As discussed above and further emphasized here, FIG. 3 is merely an example which should not unduly limit the scope of the claims. One of ordinary skill in the art would recognize many variations, alternatives, and modifications. For example, according to some embodiments, one or more of the processes 301-315 may be performed concurrently or in different orders.

In some embodiments one or more switches, controllers, and/or other networking devices may include non-transient, tangible, machine readable media that include executable code that when run by one or more processors may cause the one or more processors to perform the processes of the methods described above. Some common forms of machine readable media that may include the processes described above are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network controller for a network, the network controller comprising:
a control unit, the control unit configured to:
instruct a switch to block or partially block a port on the switch, the switch being coupled to the network controller;
instruct the switch to broadcast an address of the network controller;
receive, from a device, first identification information associated with the device, the device being connected to the port on the switch, the first identification information being addressed to the address of the network controller;
establish a network connection with the device through the switch and the port;
receive second identification information associated with the device over the network connection; and
instruct the switch to unblock the port in response to determining that the device is authorized to access the network based on a policy and a determination that a portion of the first identification information matches a portion of the second identification information;
wherein the partially blocking of the port permits exchange of one or more of LLDP, LACP, and management data traffic.

2. The network controller of claim 1, wherein the portion of the first identification information includes a first port identifier and a first identifier for the device, and wherein the portion of the second identification information includes a second port identifier and a second identifier for the device.

3. The network controller of claim 1, wherein the address of the network controller is an IP address of the network controller.

4. The network controller of claim 1, wherein the control unit is further configured to determine when the device is disconnected from the port.

5. The network controller of claim 4, wherein the control unit is further configured to instruct the switch to implement the blocking of the port in response to determining the device is disconnected from the port.

6. An information handling system comprising:
a network controller with a control unit, the control unit configured to:
instruct a first switch coupled to the network controller to block or partially block a first and second port of the first switch, wherein the partially blocking of the first port and the second port permits exchange of one or more of LLDP, LACP, and management data traffic;

receive configuration information from the first switch;

identify the first port as connected to a second switch;

instruct the first switch to unblock the first port in response to identifying the first port as connected to the second switch;

identify the second port as connected to a device;

instruct the first switch to broadcast an address of the network controller on the second port;

receive, from the device, first identification information associated with the device, the first identification information being addressed to the address of the network controller;

establish a network connection with the device through the first switch and the second port;

receive second identification information associated with the device over the network connection; and instruct the first switch to unblock the second port in response to determining that the device is authorized to access the information handling system based on a predetermined policy and a determination that a portion of the first identification information matches a portion of the second identification information.

7. The information handling system of claim 6, wherein the device is a server.

8. The information handling system of claim 6, wherein the network connection is a representational state transfer (REST) network connection.

9. The information handling system of claim 6, wherein the network connection is a secure socket layer (SSL) connection.

10. The information handling system of claim 6, wherein the second identification information includes a SSL certificate of the device.

11. The information handling system of claim 6, wherein the address of the network controller is an IP address of the network controller.

12. A method of securely providing a device access to a network fabric, the method comprising:

instructing, by a network controller, a switch within the network fabric to implement blocking or partial blocking of a port of the switch that is connected to the device, wherein the partial blocking of the port permits exchange of one or more of LLDP, LACP, and management data traffic;

instructing, by the network controller, the switch to broadcast an address of the network controller;

receiving, by the network controller from the device, first identification information associated with the device, the first identification information being addressed to the address of the network controller;

establishing, by the network controller, a network connection with the device through the switch and the port;

receiving, by the network controller, second identification information associated with the device over the network connection; and instructing, by the network controller, the switch to unblock the port in response to determining that the device is authorized to access the network fabric based on a policy and a determination that a portion of the first identification information matches a portion of the second identification information.

13. The method of claim 12, wherein the portion of the first identification information includes a first port identifier and a first identifier for the device, and wherein the portion of the second identification information includes a second port identifier and a second identifier for the device.

14. The method of claim 12, the method further comprising determining that the device is disconnected from the port and blocking data traffic on the port in response to determining that the device is disconnected from the port.

* * * * *